United States Patent
Peeters et al.

(10) Patent No.: US 9,654,968 B2
(45) Date of Patent: May 16, 2017

(54) CERTIFIED-BASED CONTROL UNIT-KEY FOB PAIRING

(71) Applicant: TEXAS INSTRUMENTS INCORPORATED, Dallas, TX (US)

(72) Inventors: Eric Peeters, Frisco, TX (US); Jin-Meng Ho, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 230 days.

(21) Appl. No.: 13/942,367

(22) Filed: Jul. 15, 2013

(65) Prior Publication Data

US 2014/0025950 A1    Jan. 23, 2014

Related U.S. Application Data

(60) Provisional application No. 61/672,463, filed on Jul. 17, 2012, provisional application No. 61/672,474, filed on Jul. 17, 2012.

(51) Int. Cl.
*H04L 29/06* (2006.01)
*H04W 12/04* (2009.01)
(Continued)

(52) U.S. Cl.
CPC ........ *H04W 12/04* (2013.01); *G06K 7/10227* (2013.01); *G07C 9/00309* (2013.01); *H04L 9/0838* (2013.01); *H04L 9/0844* (2013.01); *H04L 9/0861* (2013.01); *H04L 9/0897* (2013.01); *H04L 9/14* (2013.01); *H04L 9/3066* (2013.01); *H04L 9/3271* (2013.01); *H04L 63/0428* (2013.01); *H04L 63/061* (2013.01); *G07C 2009/00769* (2013.01); *H04L 2209/24* (2013.01); *H04L 2209/805* (2013.01); *H04L 2209/84* (2013.01)

(58) Field of Classification Search
CPC ......................... H04L 63/0428; H04L 63/061
USPC ...................................................... 713/168
See application file for complete search history.

(56) References Cited

U.S. PATENT DOCUMENTS 6,085,320 A * 7/2000 Kaliski, Jr. .................. 713/168
7,437,183 B2 10/2008 Makinen
(Continued)

FOREIGN PATENT DOCUMENTS

JP   2009278506 A    11/2009
WO   2004085213 A1   10/2004

OTHER PUBLICATIONS

Raya, Maxim, Panos Papadimitratos, and Jean-Pierre Hubaux. "Securing vehicular communications." IEEE Wireless Communications Magazine, Special Issue on Inter-Vehicular Communications 13.LCA-ARTICLE-2006-015 (2006): 8-15.*

*Primary Examiner* — Syed Zaidi
(74) *Attorney, Agent, or Firm* — Kenneth Liu; Charles A. Brill; Frank D. Cimino

(57) ABSTRACT

A key fob-control unit pairing device that includes a transceiver to transmit and receive signals, a memory to store a certificate of authenticity (CertVD) associated with the pairing device and a public key (PKVM), and a processor coupled to said transceiver and memory. The processor is to receive a public key (PKKF) from a key fob and associated with the key fob and a certificate of authenticity (CertKF) associated with the key fob, verify the CertKF with the PKVM, and transmit an encrypted PKKF to a control unit.

20 Claims, 6 Drawing Sheets

(51) Int. Cl.
*H04L 9/08* (2006.01)
*G06K 7/10* (2006.01)
*G07C 9/00* (2006.01)
*H04L 9/14* (2006.01)
*H04L 9/30* (2006.01)
*H04L 9/32* (2006.01)

(56) References Cited

U.S. PATENT DOCUMENTS

| | | | |
|---|---|---|---|
| 8,316,237 B1* | 11/2012 | Felsher | H04L 9/0825 |
| | | | 380/282 |
| 2002/0108041 A1* | 8/2002 | Watanabe et al. | 713/175 |
| 2010/0111307 A1* | 5/2010 | Hu et al. | 380/277 |
| 2011/0071734 A1* | 3/2011 | Van Wiemeersch | G08C 17/02 |
| | | | 701/49 |
| 2012/0030467 A1* | 2/2012 | Schaefer | 713/169 |
| 2012/0115446 A1 | 5/2012 | Gautama et al. | |

* cited by examiner

US 9,654,968 B2

CERTIFIED-BASED CONTROL UNIT-KEY FOB PAIRING

CROSS-REFERENCE TO RELATED APPLICATION

The present application claims priority to U.S. Provisional Patent Application No. 61/672,463, filed on Jul. 17, 2012 and U.S. Provisional Patent Application No. 61/672,474, filed on Jul. 17, 2012 ; which is hereby incorporated herein by reference.

BACKGROUND

Wireless key fobs and their respective vehicles may use encrypted operational keys to authenticate communications that occur between the two. For the key fob and the vehicle to be able to communicate, they must be paired at some point in either the manufacturing or the sales process. The pairing of wireless key fobs and their respective vehicles conventionally requires the vehicle manufacturer to deliver to the various vehicle dealers a secret key associated with each key fob where the secret key is a cryptographic key. A key fob's secret key may be then be used to associate the key fob with a vehicle, or pair the key fob and the vehicle. Multiple key fobs are typically paired with each vehicle. This step of delivering to the vehicle dealers the secret key may and the fact that each of these key fobs must store the secret key, however, open a means for theft of the secret key leading to unauthorized key fobs and potential theft.

SUMMARY

The problems noted above are solved in large part by a key fob-control unit pairing device that includes a transceiver to transmit and receive signals, a memory to store a certificate of authenticity (CertVD) associated with the pairing device and a public key (PKVM), and a processor coupled to said transceiver and memory. The processor is to receive a public key (PKKF) from a key fob and associated with the key fob and a certificate of authenticity (CertKF) associated with the key fob, verify the CertKF with the PKVM, and transmit an encrypted PKKF to a control unit.

The solution may also involve a key fob that includes a transceiver to receive and send signals, a memory to store a public key (PKKF) and a certificate of authenticity (CertKF) associated with the key fob, and a processor coupled to said transceiver and memory. The processor is to transmit the PKKF and the CertKF to a pairing device, execute a public key agreement protocol to generate a common secret encryption key, and receive, from a control unit, an operation key encrypted with the common secret encryption key.

Another solution to the above problem may be a method to pair a key fob and a control unit of a vehicle that includes reading, by a pairing device, a public encryption key (PKKF) and a certificate of authenticity (CertKF) from a key fob, verifying, by the pairing device, the CertKF using a public encryption key of a vehicle manufacturer (PKVM), transmitting, by the pairing device, a certificate of authenticity (CertVD) to a control unit, verifying, by the control unit, the CertVD using the PKVM, executing, by the pairing device and the control unit, a public key agreement to generate an encryption key DHKey1, encrypting, by the pairing device, the PKKF using the DHKey1, transmitting, by the pairing device, the encrypted PKKF to the control unit, executing, by the control unit and the key fob, a public key agreement to generate an encryption key DHKey2, encrypting, by the control unit, an operational key using the DHKey2, and transmitting, by the control unit, the encrypted operational key to the key fob.

BRIEF DESCRIPTION OF THE DRAWINGS

For a detailed description of exemplary embodiments of the invention, reference will now be made to the accompanying drawings in which.

NOTATION AND NOMENCLATURE

Figure 1:
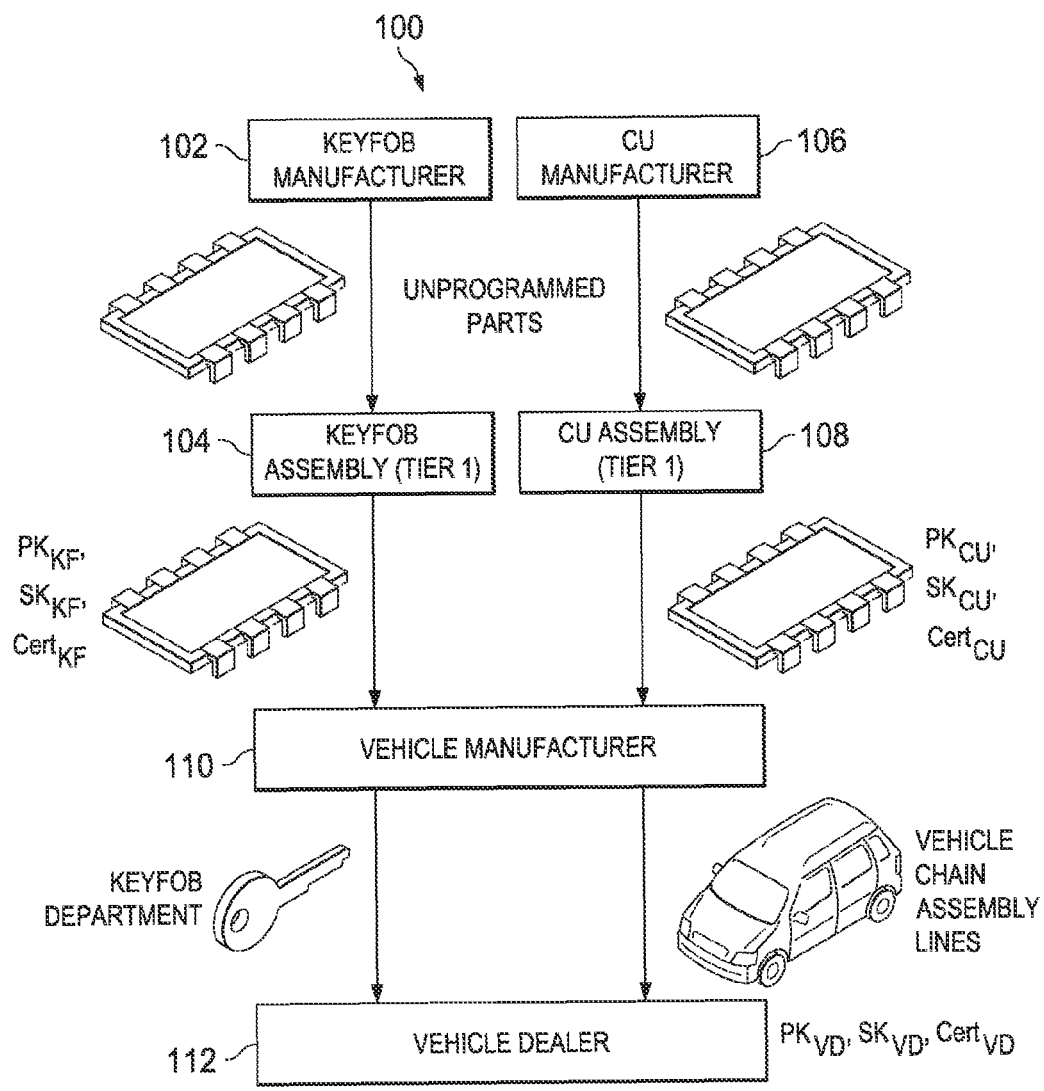
FIG. 1 shows an example vehicle manufacturing flow from sub-unit manufacturing to the vehicle dealership implementing a certificate-based authentication key fob-control unit pairing in accordance with various examples as discussed herein.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct wired or wireless connection, or through an indirect wired or wireless connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

The pairing of key fobs and vehicles (e.g., automobiles, motorcycles, boats, scooters, etc.) may entail the transport and use of secure information to ensure imposter key fobs are not paired with vehicles, which may lead to theft. The full conventional process may be kept secret by vehicle manufacturers to ensure the security of their vehicles. This process, however, may require the manufacturer to develop an expensive and dedicated IT system to generate secret keys and to maintain their security. Yet, when vehicles are delivered to dealerships, the secret keys are passed along so that multiple key fobs may be paired at the final destination. The transportation of the secret keys from manufacturer to dealer may present an opportunity for the secret keys to be stolen leading to rogue and imposter key fobs.

In addition to vehicles, the disclosed methods may also be used to pair a key fob with any type of control unit that allows for wireless connectivity and control. For instance, the disclosed techniques and devices may be part of a garage door system, hotel entrance system, or a remote entry for a home. As such, the scope of this disclosure is not limited to control units of vehicles. The use of vehicles and the pairing of key fobs with one or all the control units of a vehicle is mainly for descriptive purposes.

Disclosed herein are devices and methods for pairing key fobs with vehicles that may avoid the transport of the secret information to the dealerships and that may reduce the IT requirements of the vehicle manufacturers. One method, a certificate-based authentication process, may involve the use of authenticated certificates and public/private key pairs associated with the various components and actors involved in the pairing process. In the certificate-based approach, a pairing device may receive the public key and the certificate from an associated key fob. The pairing device may also be authenticated by a vehicle control unit and establish a secret key between the pairing device and the control unit. The pairing device may then encrypt the public key of the key fob with the secret key and transmit the encrypted public key to the control unit. The control unit may then know what key fob with which to pair. The control unit and the key fob may then generate another secret key to use between themselves, which may then be used by the control unit to encrypt an operational key. The encrypted operational key may then be communicated to the key fob so to pair the two devices.

The certificate-based approach to pairing a key fob to a control unit may involve all actors (manufacturers, assemblers, dealerships, etc.) to obtain a public and secret (private) encryption key, which may be used to authenticate one another in the pairing process. That may mean that each vehicle dealership (or dealer/pairing device), the vehicle manufacturer, each key fob manufactured and assembled and each control unit manufactured and installed in a vehicle to have their own associated public/secret key pairs. Once the components involved have acquired their key pairs, the public keys may be certified by a trusted third party or a certificate authority (CA). The CA may receive the public key and identification from the associated component to prove their identity. After their identity is proven, the CA may then sign the party's public key with the trusted third party's secret key. The signed public key becomes the certificate of authenticity for the requesting party. To verify the identity of a certificate, another party needs to unlock the certificate using the trusted third party's public key. The CA, for example, may be the vehicle manufacturer or a third party designated by the car manufacturer.

The various components—key fobs, pairing devices, and control units—may use certain public/secret keys and certificates to authenticate one another and to generate secret encryption keys to use for passing information between one another. The generation of the secret keys may use a public key agreement protocol, such as elliptical curve Diffie-Hellman (ECDH) or Elliptic Curve Cryptography (ECC). A pair of components, such as a key fob and a control unit, may use the secret encryption key as part of the pairing process.

FIG. 1 shows an example vehicle manufacturing flow 100 from sub-unit manufacturing to the vehicle dealership implementing a certificate-based authentication key fob-control unit pairing in accordance with various examples as discussed herein. The flow 100 may include a key fob manufacturer 102, a key fob assembly 104 (showing tier 1 of potentially multiple tiers), a control unit (CU) manufacturer 106, a CU assembly 108 (showing tier 1 of potentially multiple tiers), a vehicle manufacturer 110, and a vehicle dealer 112. The flow 100 shows the progression of components that may eventually be paired for operation and entrance into a corresponding vehicle. Each vehicle may have multiple CUs with each CU controlling a different function, i.e., ignition, braking, entrance, trunk, etc. An individual key fob may be paired with one, a few, or all of the CUs of a corresponding vehicle. Additionally, each vehicle and various numbers of the CUs may be paired with multiple key fobs. Further, each key fob associated with a vehicle may be deactivated if lost or stolen without affecting any other key fobs associated with that same vehicle.

Each key fob may have a public key ($PK_{KF}$) and a secret key ($SK_{KF}$) pair assigned to it and internally stored. The $PK_{KF}/SK_{KF}$ pair may be generated for and installed in each key fob by the key fob manufacturer 102, the key fob assembly 104 or the vehicle manufacturer 110. The vehicle manufacturer 110 may choose the most trusted entity for the generation and installation of the $PK_{KF}/SK_{KF}$ pairs to ensure secrecy and security. The same goes for each control unit that is manufactured and installed in a vehicle—each will have a key pair ($PK_{CU}/SK_{CU}$) generated and installed into an associated CU by a trusted party—the CU manufacturer 106, the CU assembly 108 or the vehicle manufacturer 110.

In addition to the key fobs and CUs including their respective PK/SK pairs, each unit may also include a certificate of authenticity (Cert) that authenticates the component's identity. Conventionally, a Cert is a verified and signed public key where the Cert is signed by a CA. The CA may sign a Cert with its secret key. For security reasons, the vehicle manufacturer 110 may be the trusted third party so they can control the flow and validity of Certs in the manufacturing and key fob-auto pairing process. As such, the vehicle manufacturer 110 may sign all public keys with its secret key ($SK_{VM}$) to generate a corresponding certificate. For example, a $Cert_{KF}$ will be inserted into an associated key fob. A $Cert_{CU}$ may correspond to a CU.

The vehicle dealer 112 may also obtain a key pair ($PK_{VD}$ and $SK_{VD}$) in order to be verified in the key fob-CU pairing process. The vehicle dealer 112's key pair (and an associated $Cert_{VD}$ also signed by the vehicle manufacturer 110) may be associated with a dealer pairing device or simply a pairing device. For simplicity of discussion, the key fob-auto pairing will be described as occurring at the vehicle dealer 112, but the pairing may also occur at the vehicle manufacturer 110 without straying from the bounds of the present disclosure.

Before any key fob-CU pairing may commence, some conditioning steps may take place at the various manufacturing and/or assembly locations. The conditioning may be performed to prime the separate components—key fobs, CUs, dealership (pairing device)—so that the pairing functions as intended. However, the conditioning and pairing steps may be done serially. If, for example, as is described herein, the pairing is performed at the vehicle dealer 112, then the conditioning may occur at the vehicle manufacturer 110.

Figure 2:
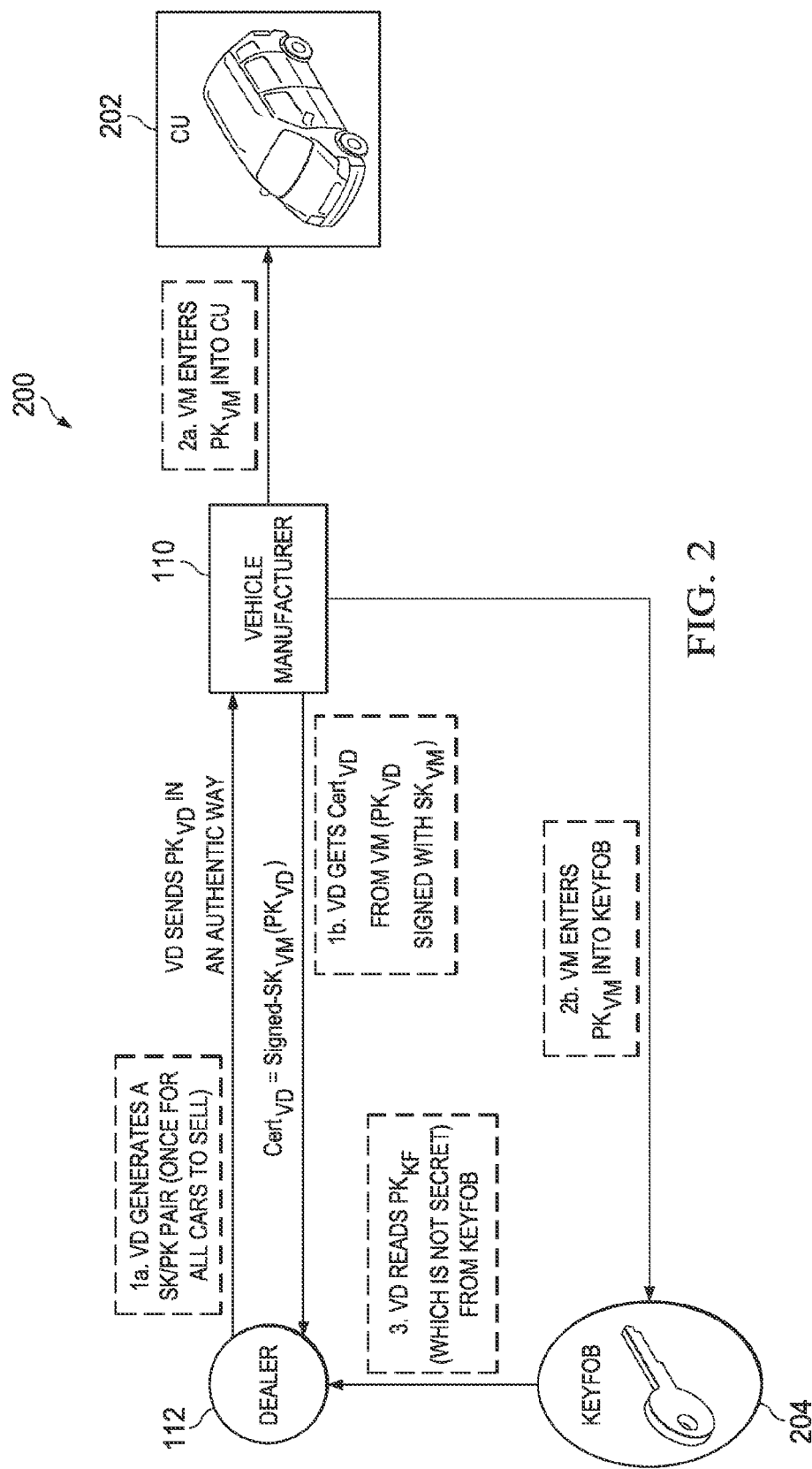
FIG. 2 is an example key fob and control unit pre-pairing conditioning process for certificate-based authentication in accordance with various examples as described herein.

FIG. 2 is an example key fob and control unit pre-pairing conditioning process 200 for certificate-based authentication in accordance with various examples as described herein. The conditioning process 200 may involve the vehicle manufacturer 110, the vehicle dealer 112, a CU 202 and a key fob 204. The steps of the conditioning process 200 are shown in a certain order but changes to the order are within the scope of the present disclosure. The order shown is for illustrative purposes only. The goal of the conditioning process 200 may be to condition or prime the respective components to facilitate the initial pairing of a key fob and a CU, which may occur at the vehicle manufacturer 110's location or at a vehicle dealership 112.

The conditioning process 200 may begin at step 1a with the vehicle dealer 112 generating their encryption key pair—$PK_{VD}$ and $SK_{VD}$—as discussed above. The dealer 112 may then transmit its $PK_{VD}$ in an authentic way to the vehicle manufacturer 110. Transmitting in an authentic way may ensure the vehicle dealer 112's identity to the vehicle manufacturer 110 and the authentic transmission may be physically mailing the $PK_{VD}$ or delivering the $PK_{VD}$ by a courier or some other form of verified transmission. Upon receipt of the $PK_{VD}$, the vehicle manufacturer 110 may then certify the $PK_{VD}$ by signing the $PK_{VD}$ with the vehicle manufacturer 110's secret key, $SK_{VM}$, generating a certificate of authenticity ($Cert_{VD}$) for the vehicle dealer 112. The vehicle manufacturer 110 then sends the $Cert_{VD}$ back to the dealer 112, which may be inserted into the dealer's associated pairing device.

The conditioning process 200 may also include the vehicle manufacturer 110 inserting its public key, $PK_{VM}$, into each vehicle's CU(s) 202 and also into each key fob 204. The $PK_{VM}$ inserted into the key fob 204 and the CU 202 may be used at a later time to verify the authenticity/identity of another device since all certificates of authenticity should be signed by the vehicle manufacturer 110, which can be verified using the $PK_{VM}$.

Lastly, as part of the conditioning process 200, the dealer 112 may read each key fob 204's $PK_{KF}$, which is not secret. The dealer may receive numerous key fobs 204 at a time and may decide to read all of their associated public keys at once to store in the pairing device. Alternatively, the dealer 112 may read the $PK_{KF}$ of a single key fob as part of the initial pairing process, to be described below.

Figure 3:
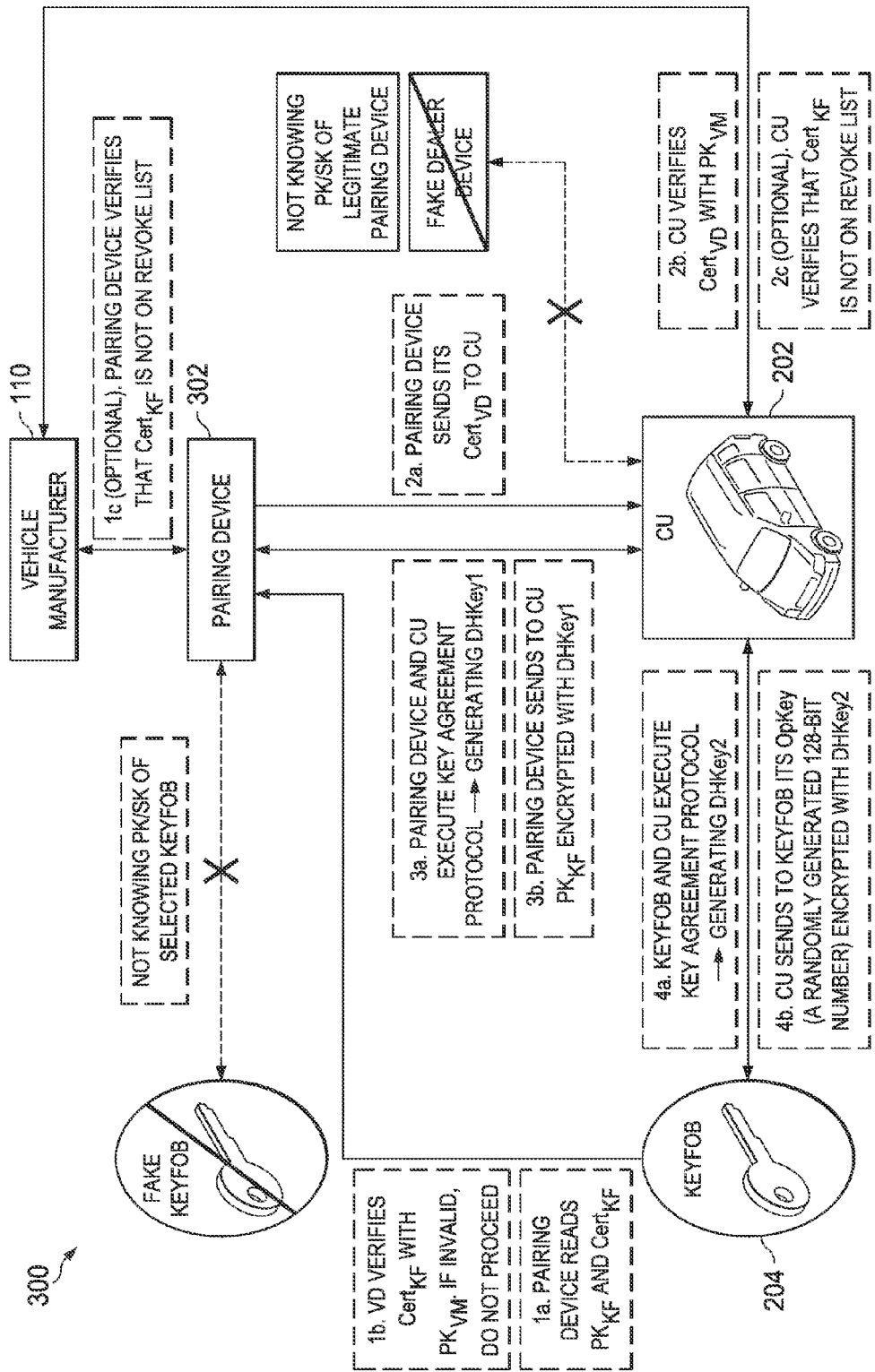
FIG. 3 shows an example of an initial pairing process of a control unit and a key fob using certificate-based authentication in accordance with various embodiments as discussed herein.

FIG. 3 shows an example of an initial pairing process 300 of a control unit and a key fob using certificate-based authentication in accordance with various embodiments as discussed herein. The initial pairing process 300 may be performed at a vehicle manufacturer's location or at a vehicle dealership as shown. The initial pairing process 300 may include the vehicle manufacturer 110, a pairing device 302 associated with a vehicle dealer 112, the key fob 204 and the CU 202. The pairing device 302 may already contain the $PK_{VM}$, both may be used to verify the identities of the other components—the CU 202 and the key fob 204. The pairing device 302 may be in communication with the key fob 204 and the control unit 202 via a wireless connection, such as with Bluetooth, ultra-high frequency (UHF), or low frequency (LF), or they may be connected via a wire. Wireless and wired connections between the components are in the scope of this disclosure. Additionally or alternatively, the pairing device 302 may communicate wirelessly with one component, the key fob 204 for instance, and communicate via a wire with another component, the CU 202 for instance.

Further, the pairing device 302 may be a handheld device, a fixed terminal, or a secure computer in a secure location of either the vehicle dealer 112 or the vehicle manufacturer 110 depending on where the pairing process is to occur. In either embodiment, the pairing device 302 may have a secure communication channel with the vehicle manufacturer 110. The secure communication channel may be a permanent connection or may be periodically established, nightly for example, to update lists and receive secure communications.

The initial pairing process 300 may begin by the pairing device 302 receiving from the key fob 204 the PKKF and the $Cert_{KF}$ associated with the key fob, step 1a. The information may be sent to the pairing device 302 from the key fob 204 as a result of a request sent by the pairing device 302. Alternatively, the key fob 204 may be periodically broadcasting its $PK_{KF}$ and $Cert_{KF}$. The pairing device 302 may then verify the identity of the key fob 204 by verifying the authenticity of the $Cert_{KF}$, step 1b. The $Cert_{KF}$ may be verified by the pairing device using the stored $PK_{VM}$. The verification of the $Cert_{KF}$ may be performed by hashing the $Cert_{KF}$ with the $PK_{VM}$.

If the pairing device 302 is unable to verify the $Cert_{KF}$, the key fob 204 associated with that $Cert_{KF}$ may be deemed a rogue and further pairing steps halted. Additionally or alternatively, the pairing device 302 may verify that the received $Cert_{KF}$ is not on a certificate revocation list (CRL) maintained by the vehicle manufacturer 110, step 1c. This verification step may ensure that a specific $Cert_{KF}$ has not been used numerous times before, which may signal a fraudulent key fob. The CRL may be stored in the memory of the pairing device 302 and periodically updated or the pairing device 302 may have constant access to the CRL maintained on a server at the vehicle manufacturer 110.

The pairing device 302, before, after or simultaneously with verifying the key fob 204, may begin communications with the CU 202 so that the CU 202 may verify the identity of the pairing device 302. The pairing device 302, step 2a, sends its $Cert_{VD}$ to the CU 202. The CU 202, using the $PK_{VM}$, verifies the authenticity of the $Cert_{VD}$. Additionally or alternatively, the CU 202 may verify that the $Cert_{VD}$ is not on a CRL, also maintained by the vehicle manufacturer 110. The CU 202 may use a wireless access point at the vehicle dealer 112 to access the internet and a server at the vehicle manufacturer 110 to determine if the $Cert_{VD}$ is on the revoke list, for example.

If the $Cert_{VD}$ is unverifiable or is on the CRL, then the CU 202 may determine the pairing device 302 and/or the dealer 112 is fraudulent. If deemed fraudulent, the CU 202 may cease communicating with the pairing device 302 and may alert the vehicle manufacturer 110.

If the CU 202 is able to verify the pairing device 302, then, step 3a, both the CU 202 and the pairing device 302 execute a key agreement protocol to generate a common secret key, DHKey1, which may only be known by the pairing device 302 and the CU 202. After generation of the DHKey1, the pairing device 302 may encrypt the $PK_{KF}$ of the key fob 202 and transmit the encrypted $PK_{KF}$ to the CU 202. Since the CU 202 knows the DHKey1 and can decrypt the message revealing the $PK_{KF}$, the CU 202 knows what key fob 204 with which to communicate and pair.

The CU 202 may initiate communication with the key fob 202, direct via wirelessly or through the pairing device 302. Once a communication link is established between the key fob 204 and the CU 202, the two components 202, 204, step 4a, may execute a key agreement protocol to generate a common secret key, DHKey2, known only by the CU 202 and the key fob 204. The CU 204, step 4b, may then generate an operational key (OpKey), encrypt the OpKey using DHKey2, and transmit the encrypted OpKey to the key fob 204. The OpKey may be a randomly generated 128-bit number.

The key fob 204 may then decrypt the message to learn the OpKey. At this point, the key fob 204 and the CU 202 may be deemed paired and normal operation may commence. The key fob 204 and the CU 202 may use the OpKey to authenticate one another in normal operation based on any standard private or public key authentication techniques, e.g. ISO 9798-2.

Pairing key fobs and control units may also be performed using identification (ID)-based authentication approach. The ID-based approach may use unique identification words associated with key fobs and CUs that may be used to both authenticate one another and to generate secret keys between the devices. The secret keys would then be used to encrypt and decrypt information sent between the two components. The pairing of the key fob and the CU, again, may be facilitated by a pairing device located at either the vehicle dealership or at the vehicle manufacturer and which may be similar to the pairing device 302.

Figure 4:
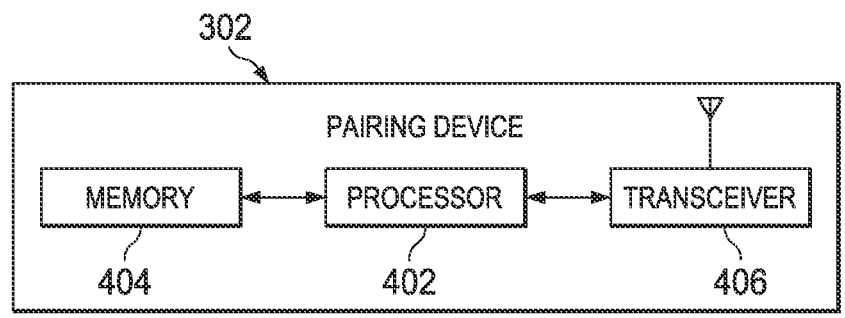
FIG. 4 is a block diagram of an example pairing device in accordance with various examples discussed herein.
Figure 5:
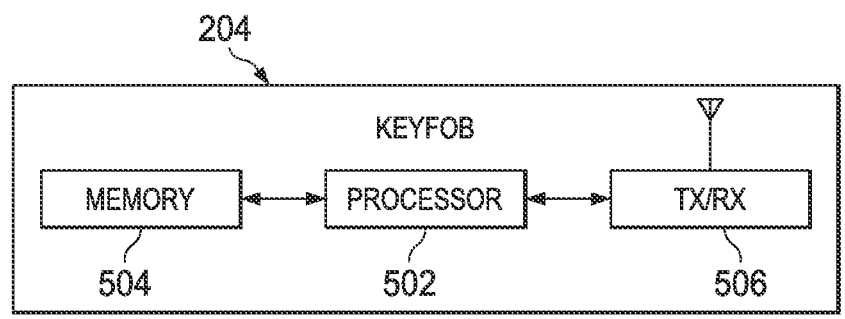
FIG. 5 is a block diagram of an example key fob in accordance with various examples discussed herein.
Figure 6:
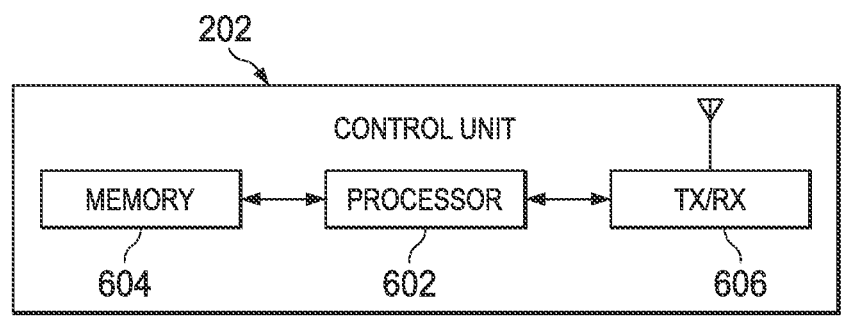
FIG. 6 is a block diagram of an example control unit in accordance with various examples discussed herein.

FIGS. 4, 5, and 6 show block diagrams of an example pairing device 302, key fob 204 and CU 202, respectively, in accordance with various examples discussed herein. The three devices/components—pairing device, key fob, and CU—may all comprise a processor (402, 502, 602), a memory (404, 504, 604), and a transceiver (406, 506, 606). The processors of the three devices/components may be used to perform the authentication computations and the common secret key generation computations associated with the certificate-based authentication pairing and the ID-based authentication pairing. The processors may be a standard CPU, a microcontroller, a low-power digital signal processor, etc. and may be capable of performing complex calculations in a short time.

The memories of the three devices may be used to store the public and private key pairs and the certificates of authenticity associated with their respective device for the certificate-based authentication pairing. Alternatively or additionally, the memories of the three devices may be used to store the IDs of their own or the other devices. For example, in the ID-based authentication pairing, the pairing device 302 may store both the KFID and the CUID before initiating a paring sequence. The KFID and CUID for those two associated devices may be stored in the memory 404 of the pairing device 302. The memories may be a non-volatile storage device such as flash memory or an EEPROM.

The transceivers for the three devices may be wired (not shown), wireless or capable of both. The transceivers may be used by the devices to communicate the IDs, public keys, and/or certificates of authenticity during the condition steps and the initial pairing steps for either authentication approach. The key fobs allowing for remote entry and control of vehicles may use a wireless technology such as Bluetooth, LF, or UHF for those transmissions but may also be able to communicate with the pairing device and/or the CUs via a wire during the initial pairing process.

Additionally, the pairing device 302 may include a wired connection to the vehicle manufacturer 110 so that the pairing device 302 may securely receive the CUIDs of the CUs 202 delivered to the dealer 112 for the ID-based authentication pairing. For the certificate-based authentication pairing the pairing device 302 may communicate with the vehicle manufacturer 110 when accessing a certification revoke list. Additionally, the CU 202 either via the pairing device 302 or some other connection may also access a CRL at the vehicle manufacturer 110 when checking the validity of the CertVD of the pairing device 302.

Figure 7:
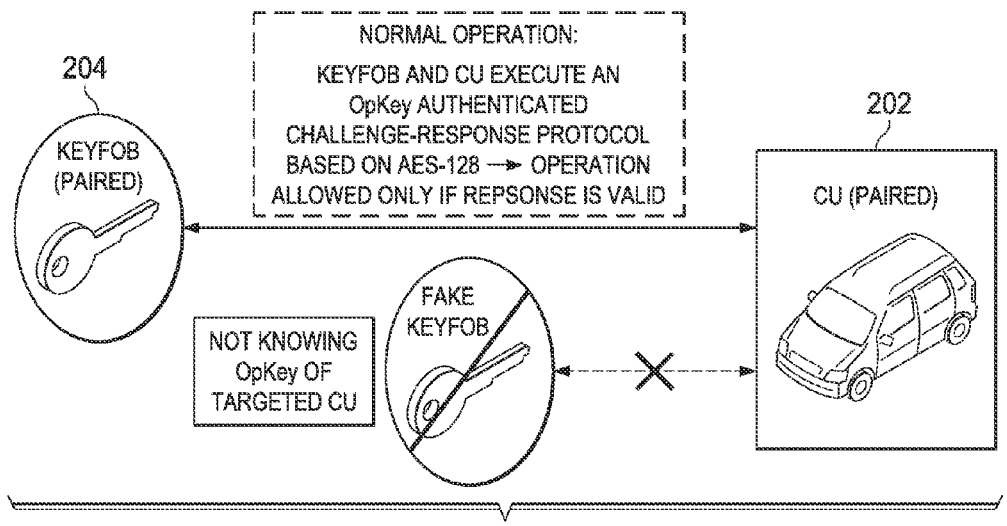
FIG. 7 shows an example operation of a paired key fob and control unit after pairing in accordance with various examples as discussed herein.
Figure 9:
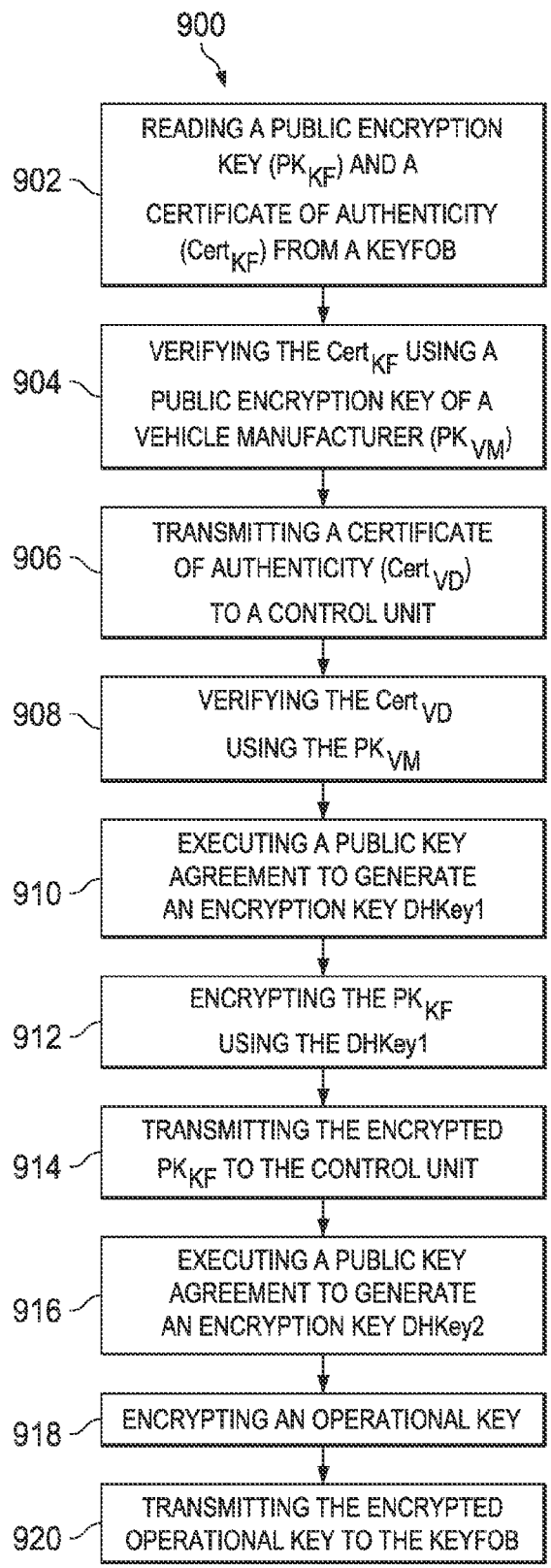
FIG. 9 is an example flow diagram of a method for the certificate-based authentication in accordance with various examples discussed herein.

FIG. 7 shows an example normal operation of a paired key fob and CU in accordance with various examples as discussed herein. The normal operation depicted in FIG. 9 shows the interaction between a key fob 204 and a CU 202 post initial pairing by the process 300 (certificate-based). The key fob and CU, when communicating with one another upon a user's interaction with the key fob for example, may first authenticate one another by executing an OpKey authenticated challenge-response protocol based on AES-128, for example. Operation of the CU by the key fob may only be allowed when the response is valid. An invalid response may signify a rogue key fob and the CU may not perform commands sent from an invalid key fob.

Figure 8:
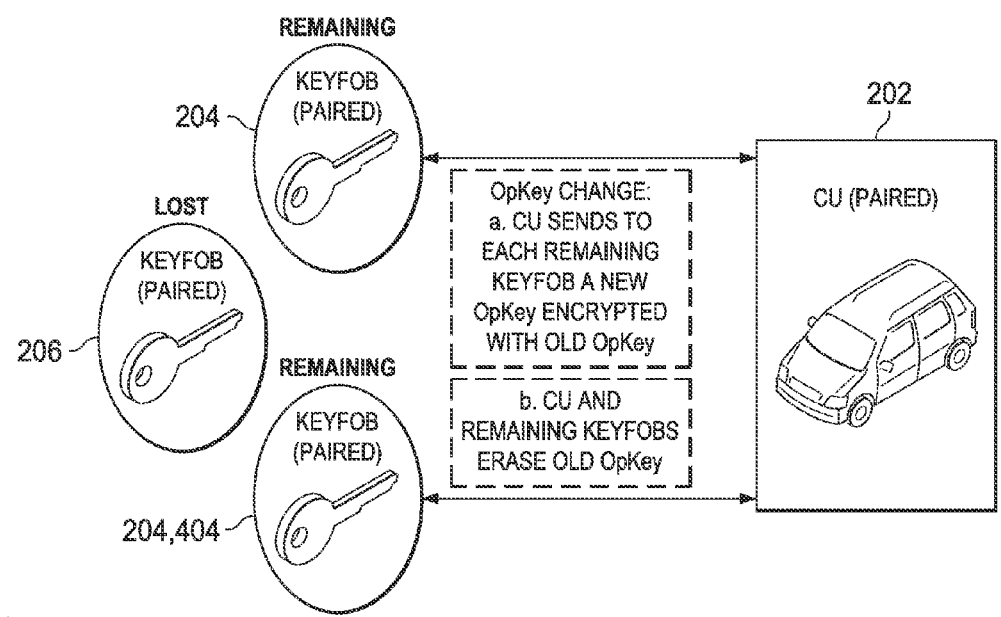
FIG. 8 shows an example of an operational key change by a CU in accordance with various examples as discussed herein.

FIG. 8 shows an example of an OpKey change by a CU in accordance with various examples as discussed herein. The CU 202 may change the OpKey when a key fob 206 is misplaced or is stolen. By changing the OpKey, the CU may prevent the missing or stolen key fob 206 from accessing the CU 202. The CU 202 may be initiated by an external signal that a new OpKey is desired. The external signal may come from the owner of the remaining key fob(s) 204 by performing a preset sequence with the key fob and vehicle or the external signal may come from the pairing device 302 of the dealer 112. Upon receiving the external signal, the CU 202 may encrypt a new OpKey using the old OpKey and then transmit the encrypted new OpKey to the remaining key fob(s) 204. After receiving the new OpKey, the old OpKey may be erased by all the CU 202 and the remaining key fobs 204. Normal operation between the devices may then continue without worry that the rogue key fob may interact with the CU.

FIG. 9 is an example flow diagram of a method 900 for the certificate-based authentication in accordance with various examples discussed herein. The method 900A may be one implementation of the initial pairing process 300 described in regards to FIG. 3. The method 900 begins at step 902 with the pairing device 302 reading a public encryption key ($PK_{KF}$) and a certificate of authenticity ($Cert_{KF}$) from the key fob 204. The method 900 continues at step 904 with the pairing device 302 verifying the $Cert_{KF}$ using a public encryption key ($PK_{VM}$) of the vehicle manufacturer 110. Step 906 continues the method 900 with the pairing device 302 transmitting the certificate of authenticity ($Cert_{VD}$) to the CU 202. The CU 202 at step 908 verifies the $Cert_{VD}$ using the $PK_{VM}$, which may be stored in the memory 804 of the CU 202. At step 910, the pairing device 302 and the CU 202 execute a public key agreement protocol to generate a common secret encryption key DHKey1, which may only be known by the pairing device and the CU.

The method 900 then continues at step 912 with the pairing device 302 encrypting the $PK_{KF}$ using the DHKey1 before the method 900 performs step 914 with the pairing device 302 transmitting the encrypted $PK_{KF}$ to the control unit 202. At step 916, the CU 202 and the key fob 204 execute a public key agreement protocol to generate a common secret encryption key DHKey2 to be shared between the CU 202 and the key fob 204. The method 900 ends with steps 918 and 920 with the CU 202 encrypting an operational key (OpKey) with DHKey2 and then transmitting the encrypted OpKey to the key fob 204. After the OpKey has been shared with the key fob 204, the CU 202 and the key fob 204 may be considered paired.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A pairing device, comprising:
a transceiver that transmits and receives signals;
a memory that stores a first certificate of authenticity associated with the pairing device and a first public key; and
a processor coupled to the transceiver and the memory, wherein the processor executes instructions stored in the memory to:
receive a second public key and a second certificate of authenticity, the second public key and the second certificate of authenticity each being associated with a key fob device;
verify the second certificate of authenticity using the first public key;
execute a key agreement protocol to generate a secret encryption key that is shared between the pairing device and a control unit;
encrypt the second public key using the secret encryption key; and
transmit the encrypted second public key to the control unit.

2. The pairing device of claim 1, wherein the processor verifies the second certificate of authenticity by determining whether or not the second certificate of authenticity is on a certificate revocation list.

3. The pairing device of claim 1, wherein the processor executes instructions to transmit, via the transceiver, the first certificate of authenticity to the control unit for verification before executing the key agreement protocol.

4. The pairing device of claim 1, wherein the key agreement protocol is based on elliptical curve Diffie-Hellman (ECDH) encryption.

5. The pairing device of claim 1, wherein the key agreement protocol is based on elliptical curve cryptography (ECC).

6. The pairing device of claim 1, wherein the first public key is associated with a certificate authority.

7. The pairing device of claim 6, wherein the certificate authority is a vehicle manufacturer and the control unit is installed in a vehicle.

8. The pairing device of claim 6, wherein the first certificate of authenticity is generated by signing a third public key using a private key associated with the certificate authority.

9. The pairing device of claim 6, wherein the certificate authority and the control unit are separate.

10. The pairing device of claim 1, wherein the second certificate of authenticity is verified using the first public key by hashing the second certificate of authenticity with the first public key.

11. A first device, comprising:
a transceiver that transmits and receives signals;
a memory that stores a first certificate of authenticity associated with the first device and a first public key; and
a processor coupled to the transceiver and the memory, the processor executing instructions stored in the memory to:
receive, using the transceiver, a second public key and a second certificate of authenticity, the second public key and the second certificate of authenticity each being associated with a second device, wherein the second public key is received separately from the second certificate of authenticity;
verify the second certificate of authenticity using the first public key;
execute a key agreement protocol to generate a secret encryption key that is shared between the first device and a third device;
encrypt the second public key using the secret encryption key; and
transmit, using the transceiver, the encrypted second public key to the third device;
wherein the first, second, and third devices are separate from each other.

12. The first device of claim 11, wherein the processor verifies the second certificate of authenticity by determining whether or not the second certificate of authenticity is on a certificate revocation list.

13. The first device of claim 11, wherein the processor executes instructions to transmit, using the transceiver, the first certificate of authenticity to the third device for verification before executing the key agreement protocol.

14. The first device of claim 11, wherein the key agreement protocol is based on a Diffie-Hellman encryption.

15. The first device of claim 11, wherein the first public key is associated with a certificate authority that is separate from the first, second, and third devices.

16. The first device of claim 15, wherein the first certificate of authenticity is generated by signing a third public key using a private key associated with the certificate authority.

17. The first device of claim 11, wherein the transceiver includes a wired transceiver and a wireless transceiver.

18. The first device of claim 17, wherein using the transceiver to receive the second public key and the second certificate of authenticity comprises using the wireless transceiver.

19. The first device of claim 17, wherein using the transceiver to transmit the encrypted second public key comprises using the wired transceiver.

20. The first device of claim 17, wherein:
the wireless transceiver receives the second public key and the second certificate of authenticity; and
the wired transceiver transmits the encrypted second public key.

* * * * *